US010015873B2

(12) United States Patent
Hwang

(10) Patent No.: US 10,015,873 B2
(45) Date of Patent: Jul. 3, 2018

(54) PLASMA TORCH

(71) Applicant: Won-Gyu Hwang, Ulsan (KR)

(72) Inventor: Won-Gyu Hwang, Ulsan (KR)

( * ) Notice: Subject to any disclaimer, the term of this patent is extended or adjusted under 35 U.S.C. 154(b) by 62 days.

(21) Appl. No.: 14/890,700

(22) PCT Filed: Jul. 3, 2015

(86) PCT No.: PCT/KR2015/006864
§ 371 (c)(1),
(2) Date: Nov. 12, 2015

(87) PCT Pub. No.: WO2016/159447
PCT Pub. Date: Oct. 6, 2016

(65) Prior Publication Data
US 2017/0118831 A1 Apr. 27, 2017

(30) Foreign Application Priority Data
Apr. 2, 2015 (KR) ........................ 10-2015-0046879

(51) Int. Cl.
*B23K 10/00* (2006.01)
*H05H 1/34* (2006.01)
*H05H 1/42* (2006.01)

(52) U.S. Cl.
CPC ................ *H05H 1/34* (2013.01); *H05H 1/42* (2013.01); *H05H 2001/3457* (2013.01)

(58) Field of Classification Search
CPC ............. H05H 1/34; H05H 2001/3457; H05H 2001/3468; H05H 1/341; B23K 10/00
(Continued)

(56) References Cited

U.S. PATENT DOCUMENTS 5,214,262 A * 5/1993 Carkhuff .................. H05H 1/34 219/121.48
5,278,385 A * 1/1994 Gerome ................. B23K 26/04 219/121.68
(Continued)

FOREIGN PATENT DOCUMENTS

JP 05084579 A 4/1993
JP 11285834 A 10/1999
(Continued)

OTHER PUBLICATIONS

International Search Report issued in PCT/KR2015/006864 dated Dec. 30, 2015, 5 pages.
(Continued)

*Primary Examiner* — Mark Paschall
(74) *Attorney, Agent, or Firm* — RatnerPrestia

(57) ABSTRACT

The present invention relates to a plasma torch including: a tube including: a first diameter part provided with a hollow channel; and a second diameter part provided at a predetermined position on the outer circumferential surface of the first diameter part; a body including: a housing part receiving the tube therein; and a plurality of first and second discharge holes formed at predetermined positions in longitudinal directions of the body; an insulator including a plurality of first discharge flow lines formed at predetermined positions vertically located from the body; an amplification tube including a space part communicating with the second discharge holes; a housing including a plurality of second discharge flow lines formed at predetermined positions of an inner circumferential surface of the housing; an inner cap combined with an outer circumferential surface of the housing; and an insulation cap engaged with an outer circumferential surface of the inner cap.

12 Claims, 7 Drawing Sheets

(58) Field of Classification Search

USPC ............ 219/121.39, 121.51, 121.52, 121.48, 219/121.5

See application file for complete search history.

(56) References Cited

U.S. PATENT DOCUMENTS

| | | | | |
|---|---|---|---|---|
| 6,320,156 | B1 * | 11/2001 | Yamaguchi .............. | H05H 1/34 219/121.5 |
| 6,617,538 | B1 | 9/2003 | Mahawili | |
| 2002/0135283 | A1 * | 9/2002 | Hackett .................... | H05H 1/34 313/231.41 |
| 2003/0034333 | A1 * | 2/2003 | Horner-Richardson . | H05H 1/34 219/121.51 |
| 2015/0319836 | A1 * | 11/2015 | Sanders ................. | B23K 10/00 219/121.49 |
| 2016/0165711 | A1 * | 6/2016 | Zhang ...................... | H05H 1/34 219/121.52 |

FOREIGN PATENT DOCUMENTS

| | | | |
|---|---|---|---|
| JP | 11297492 | A | 10/1999 |
| KP | 1019980702147 | | 7/1998 |
| KP | 100204354 | | 3/1999 |
| KP | 100276674 | | 10/2000 |
| KP | 200270697 | | 3/2002 |
| KP | 100459315 | | 11/2004 |
| KP | 100493930 | | 5/2005 |
| KR | 100497067 | B1 | 6/2005 |
| KR | 100967016 | B1 | 6/2010 |

OTHER PUBLICATIONS

Written Opinion of the International Search Authority issued in PCT/KR2015/006864 dated Dec. 30, 2015, 14 pages.

International Preliminary Report on Patentability issued in PCT/KR2015/006864 dated Oct. 3, 2017, 16 pages.

Notice of Reason for Refusal issued in Korrean Patent Application No. 2015-0046879 dated Dec. 21, 2015, 7 pages.

* cited by examiner

A - A

B - B

< a >

< b >

"A"

PLASMA TORCH

CROSS REFERENCE TO RELATED APPLICATIONS

This application is the U.S. National Phase Application of PCT/KR2015/006864, filed Jul. 3, 2015, which claims priority to Korean Patent Application No. 10-2015-0046879, filed Apr. 2, 2015, the contents of such applications being incorporated by reference herein.

TECHNICAL FIELD

The present invention relates to a plasma torch. More particularly, the present invention relates to a plasma torch constructed such that the plasma torch has a simple structure and can increase the speed of a high temperature plasma flame in a flame projecting direction.

BACKGROUND ART

A torch applying high temperature to a predetermined area is being presented in various structures depending on the kind of burning fuel (liquid fuel, gaseous fuel) and for various applications including welding, cutting, surface treatment, waste disposal, etc. In addition, in recent years, a plasma torch is being widely used to obtain higher burning heat by supplying working gas (nitrogen, oxygen, hydrogen, argon, helium, methane, propane, etc.) to plasma formed by applying high pressure current to a space located between two electrodes.

As such a plasma torch is identified in Korean patent Nos. 10-0493930, 10-0276674, 10-0459315, and 10-0204354, Korean Patent Application Publication No. 10-1998-0702147, Korean Utility Model Registration No. 20-0270697, which are incorporated by reference, it may be formed in a variety of structures, thereby it may be used in many industrial fields for applications including welding, cutting, and waste disposal.

FIG. 1 is a schematic view of a plasma torch presented in "Rotating arc plasma jet and method of use for chemical synthesis and chemical by-products abatements" disclosed in U.S. Pat. No. 6,617,538, which is incorporated by reference.

As illustrated in the drawing, a processing chamber 11 of a conventional plasma torch 10 includes a cathode housing 12, wherein the cathode housing is provided with a cathode electrode 14 therein, and power is supplied to the cathode electrode by a power source 13. The plasma torch 10 is constructed in such a manner that an anode electrode 15 is provided at a position spaced apart from an outer circumferential surface of a lower part of the cathode housing 12 so that during discharge, an arc can be generated responding to the cathode electrode 14. Particularly, the anode electrode 15 is configured to be spaced apart from the cathode electrode 14 so that a space formed in the anode electrode surrounds an end part of the cathode electrode.

On one hand, a magnetic field coil 17 is provided outside the cathode housing 12 so that a discharge arc generated between the cathode electrode 14 and the anode electrode 15 rotates in a discharge chamber 16. Accordingly, the discharge arc generated between the end part of the cathode electrode 14 and the anode electrode 15 rotates under the influence of the magnetic field, thereby projecting faster.

However, the above-mentioned plasma torch requires an additional magnetic field coil to increase the speed of a discharge arc or to generate a discharge arc. Accordingly, the plasma torch has a problem in that the plasma torch requires increasing the size thereof, and a magnetic field coil may malfunction due to high heat of an area adjacent to the magnetic field coil.

SUMMARY OF THE INVENTION

Technical Problem

Accordingly, an aspect of the present invention has been made keeping in mind the above problems occurring in the related art, and the present invention is intended to propose a plasma torch constructed such that the plasma torch is simple in structure, and can increase the speed of a high temperature plasma flame in a flame projecting direction.

In addition, an aspect of the present invention is intended to propose a plasma torch that can extend lifespan of a nozzle by minimizing the damage to the nozzle caused by a plasma flame.

Technical Solution

According to an embodiment of the present invention, there is provided a plasma torch including: a tube including: a first diameter part provided with a hollow channel to which air is introduced along a longitudinal direction; and a second diameter part provided at a predetermined position on an outer circumferential surface of the first diameter part and having a plurality of cut grooves formed in a circumferential direction of the second diameter part and spaced apart from each other at regular intervals; a body including: a housing part receiving the tube therein; and a plurality of first and second discharge holes formed at predetermined positions in longitudinal directions of the body, the first and second discharge holes being formed in circumferential directions of the body and spaced apart from each other at regular intervals, wherein two electrodes are combined with a first end of the body; an insulator including a plurality of first discharge flow lines formed at predetermined positions vertically located from the body and formed in a circumferential direction of the insulator and spaced apart from each other at regular intervals, the insulator being combined with the outer circumferential surface of the body; an amplification tube including a space part communicating with the second discharge holes, the space part being defined over the outer circumferential surface of the body; and third discharge holes formed on an end part of an outer surface of the amplification tube and communicating with the first discharge holes, wherein the amplification tube is located between the body and the insulator and is engaged with the body; a housing including a plurality of second discharge flow lines formed at predetermined positions of an inner circumferential surface of the housing and in a circumferential direction of the housing and spaced apart from each other at regular intervals, wherein the second discharge flow lines communicate with a first end of the housing and the housing is engaged with an outer circumferential surface of the insulator, and a nozzle is inserted to the first end of the housing; a handle including a cover provided at a first portion of the handle; and an air supply tube provided therein, wherein the cover receiving the body and the insulator therein is combined with a second end of the housing; an inner cap combined with an outer circumferential surface of the housing in such a manner that a portion of the nozzle is exposed to an outside of the inner cap; and an insulation cap engaged with an outer circumferential surface of the inner cap.

A branch tube may be provided on the tube at a predetermined position in a longitudinal direction thereof, the branch tube including a vortex inducing part formed on an outer circumferential surface of the tube and in a spiral shape, the vortex inducing part being located between an inner circumferential surface of the body and the outer circumferential surface of the tube, and a first branch flow line may be formed between the vortex inducing part and the inner circumferential surface of the body, and a second branch flow line may be formed between the outer circumferential surface of the tube and an inner circumferential surface of the branch tube.

An air guide part may be provided in the electrode, and when air introduced to the electrode through a hollow channel formed in the first diameter part of the tube hits inner surfaces of the electrode, the air guide part guides the air to be discharged to a space formed between the outer circumferential surface of the first diameter part and the inner circumferential surface of the body.

The air guide part includes: a body part provided with a through-hole therein; and a plurality of protrusions provided on the outer circumferential surface of the body part, the plurality of protrusions being formed in a circumferential direction thereof and spaced apart from each other at regular intervals.

An air discharge ring is combined with a first end of the inner cap, the air discharge ring including a flange part, the flange part having a plurality of discharge holes formed in a circumferential direction thereof and spaced apart from each other at regular intervals, the flange part protruding in a direction parallel to the inner circumferential surface of the inner cap.

A plurality of vortex producing grooves may be provided at predetermined positions on the inner circumferential surface of the insulation cap, the vortex producing grooves being spaced apart from each other at regular intervals.

A control cap is engaged with the second end of the body, the control cap including: a seat groove therein, and an engaging hole provided at predetermined position on an outer circumferential surface of the control cap, the engaging hole communicating with the seat groove, wherein a coil spring is provided in the seat groove, a first end of the coil spring being supported by a lower end of the seat groove, and a second end thereof being supported by a second end of the tube.

At least one protruded jaw may be provided at a predetermined position of an outer circumferential surface of the nozzle, the at least one protruded jaws being provided in a circumferential direction of the nozzle.

A welding cable may be combined with a second portion of the handle, the welding cable including: a bare copper wire; an air supply hose having an air passage and located at a position spaced apart at a predetermined interval from an outer circumferential surface of the bare copper wire; a copper tape combined with an outer circumferential surface of the air supply hose; an outer cover positioned on an outer circumferential surface of the copper tape; connectors, portions of outer circumferential surfaces of which are inserted into diametrically opposite end parts of the air supply hose, and respective ends of which are combined with diametrically opposite ends of the bare copper wire; a socket provided at a second end of the connector, wherein any one end part of opposite end parts of a metallic tube is connected to any one end part of opposite end parts of the connectors.

A sub power cable may be provided in the handle, a first end of the sub power cable being in contact with an inner part of the housing, and a second end thereof being provided with a contact ring, and when a switch member slidably combined with a guide part formed protruding from a predetermined position of an upper part of the handle comes in contact with the contact ring, power running in the air supply tube is supplied to the sub power cable.

The switch member may include: a slide having guide protrusions at opposite sides of the slide, the guide protrusions being engaged with guide grooves provided at opposed sides of the inner part of the guide part and in longitudinal directions of the guide part; a contact terminal combined with a lower part of the slide at a predetermined position; and a connecting cable, the first end of the connecting cable being combined with the contact terminal, and the second end of the connecting cable being combined with a predetermined position of the air supply tube.

A spring may be provided between a first side in the guide part and the slide, the spring applying an elastic force to the slide, and a first side in the guide part and a first side of the slide may be provided with housing grooves, a first end and a second end of the spring being housed in and supported by the housing grooves such that the housing grooves face each other.

Advantageous Effect

According to an aspect of the present invention having the above-described characteristics, it is possible to propose the plasma torch that is simple in structure, and can increase the speed of a high temperature plasma flame in a flame projecting direction since the plasma torch can increase the moving speed of air supplied thereto by using both a welding cable and an amplification tube.

In addition, the plasma torch can extend lifespan of a nozzle by minimizing the damage to the nozzle caused by a plasma flame.

Figure 1:
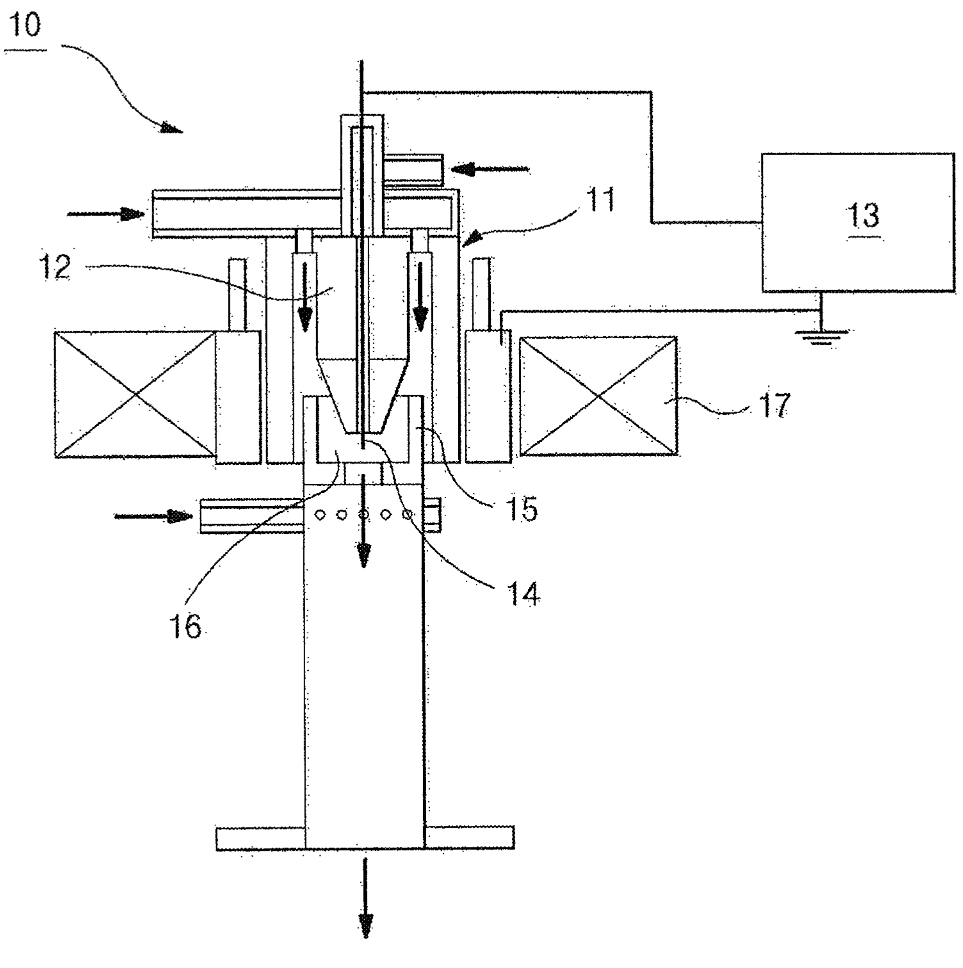
FIG. 1 is a schematic view showing the configuration of a conventional plasma torch.

| <Description of the Reference Numerals in the Drawings> |
|---|
| 110: Tube |
| 112: First diameter part |
| 114: Second diameter part |
| 116: Branch tube |
| 117: First branch flow line |
| 119: Second branch flow line |

-continued

| <Description of the Reference Numerals in the Drawings> |
| --- |
| 120: Body |
| 122: Housing part |
| 123: First discharge hole |
| 124: Second discharge hole |
| 130: Electrode |
| 140: Insulator |
| 142: First discharge flow line |
| 150: Amplification tube |
| 152: Third discharge hole |
| 160: Housing |
| 162: Second discharge flow line |
| 170: Nozzle |
| 172: Discharge hole |
| 180: Inner cap |
| 190: Insulation cap |
| 192: Vortex producing groove |
| 200: Handle |
| 210: Welding cable |

DETAILED DESCRIPTION OF THE INVENTION

Preferred Embodiment of the Invention

Hereinafter, a preferred embodiment of the present invention will be described in detail with reference to the accompanying drawings. In this process, the matters defined in the description, such as the thickness of the lines or the size of elements shown in the accompanying drawings, may be exaggerated for clarity and convenience of the description.

Furthermore, the terms described below are defined in consideration of the function of the present invention, and may be altered depending on the intention of a user or an operator. Therefore, definition of the terms should be made based on the contents throughout the present specification.

Figure 2:
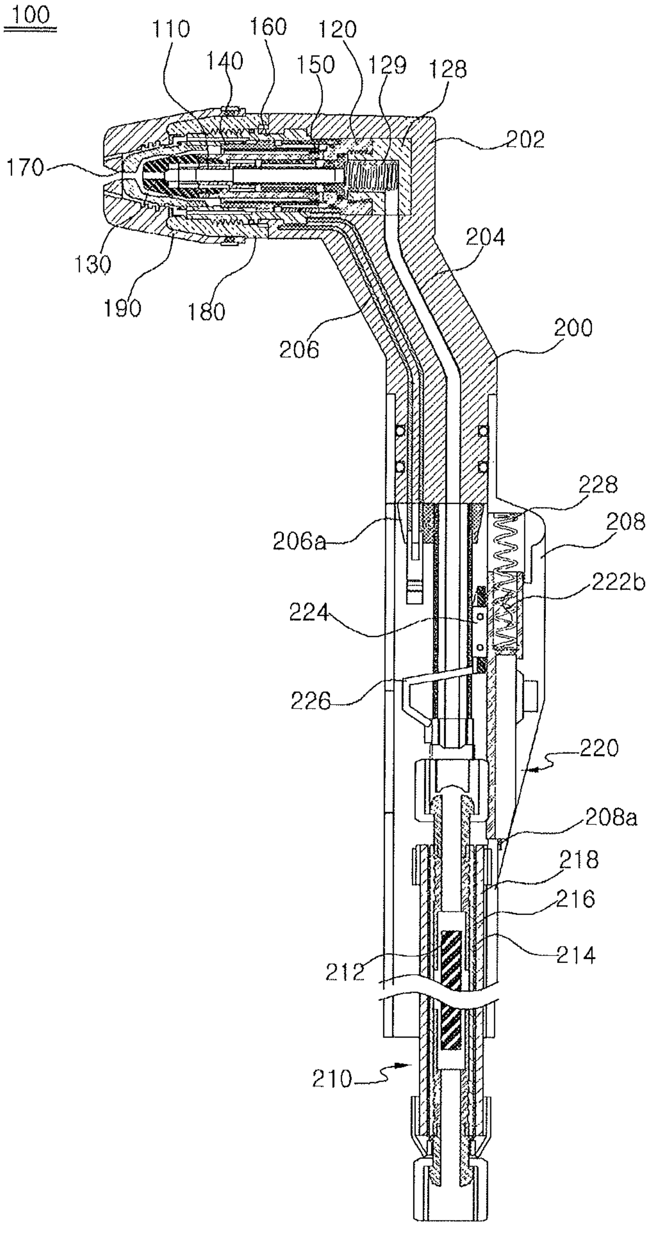
FIG. 2 is a sectional view of a plasma torch according to an embodiment of the present invention.
Figure 3:
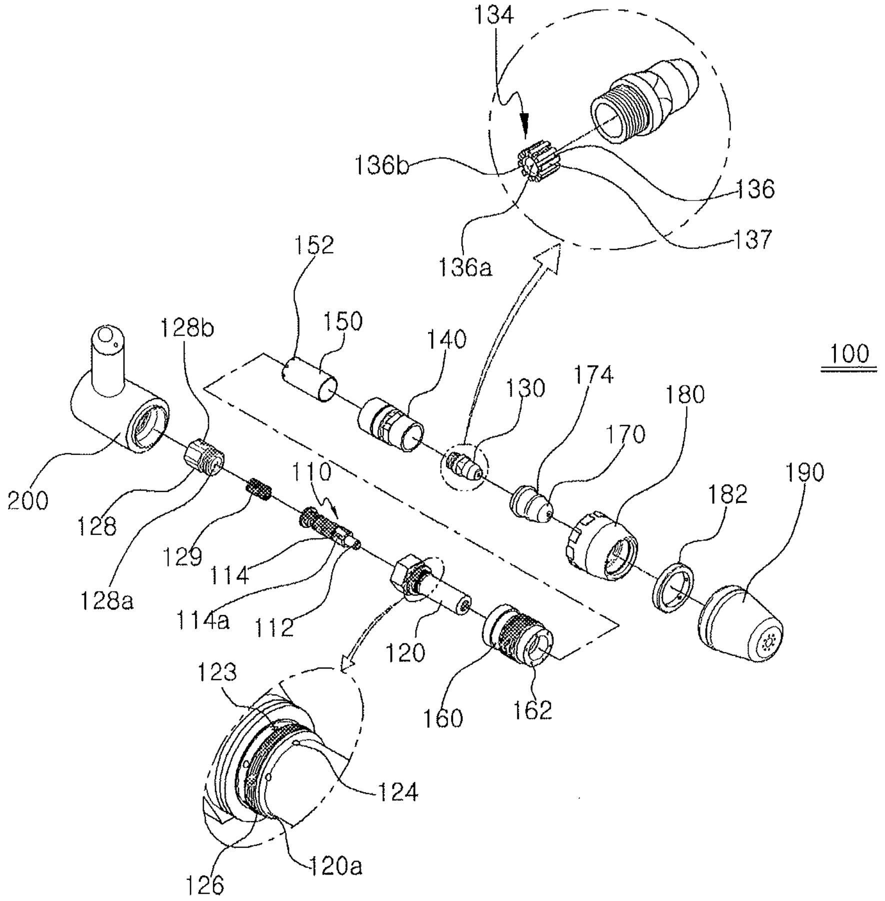
FIG. 3 is an exploded perspective view of the plasma torch according to the embodiment of the present invention.
Figure 4:
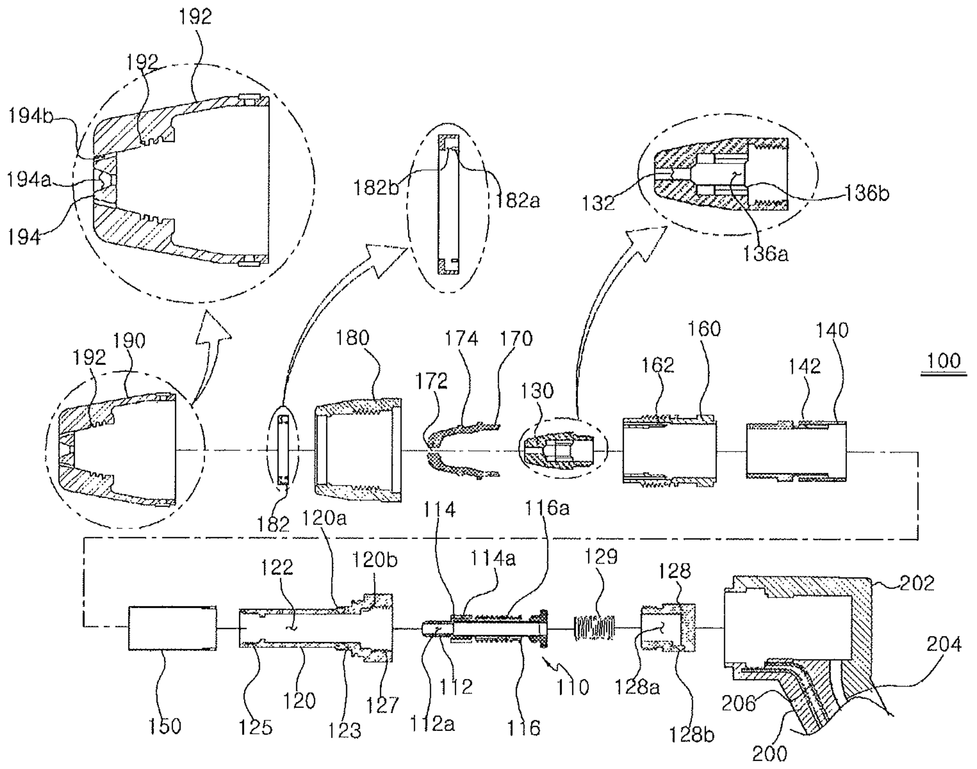
FIG. 4 is an exploded sectional view of the plasma torch according to the embodiment of the present invention.
Figure 5:
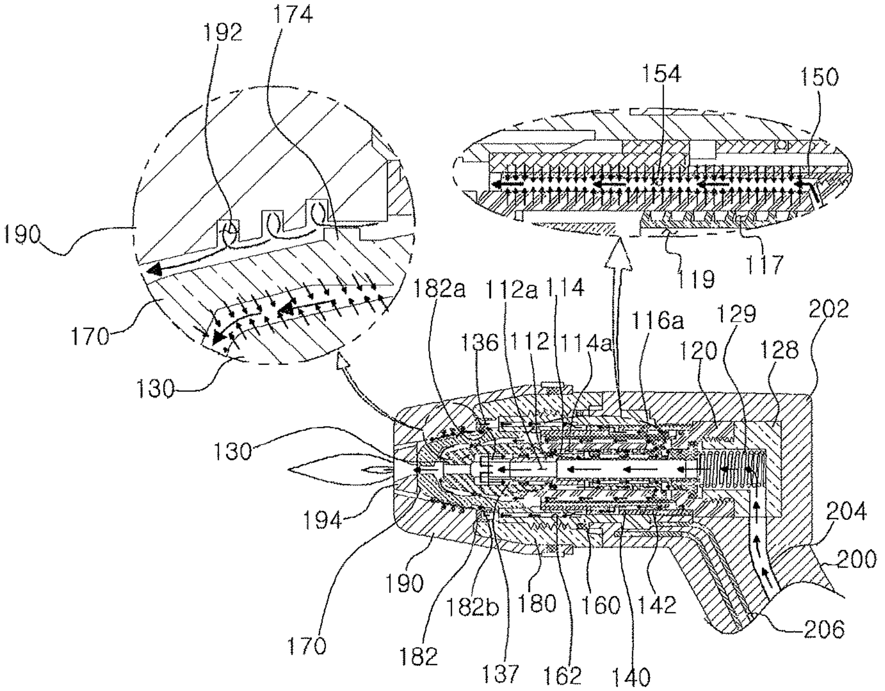
FIG. 5 is a sectional view shown for describing a moving route of air in the plasma torch according to the embodiment of the present invention.
Figure 6:
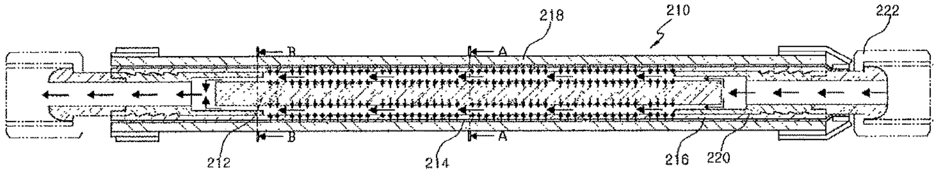
FIG. 6 is a sectional view of a welding cable shown in FIG. 2.
Figure 7:
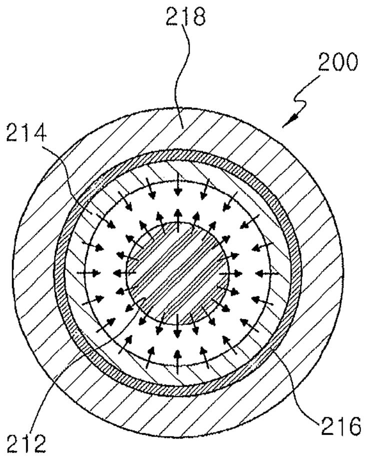
FIG. 7 shows sectional views respectively taken along line A-A and line B-B shown in FIG. 6.
Figure 7:
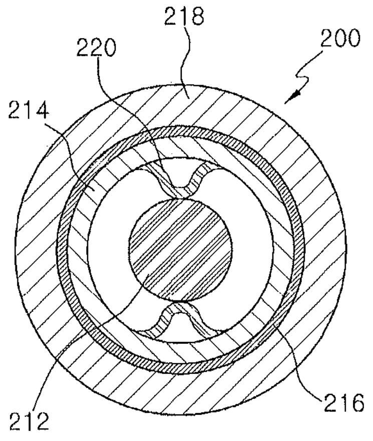
Figure 8:
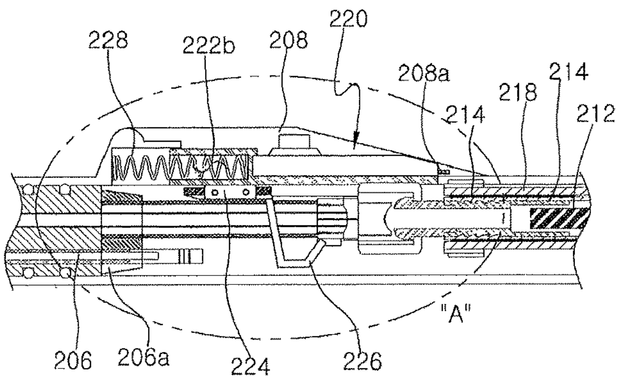
FIG. 8 is a view showing the operation of a switch member shown in FIG. 2.
Figure 8:
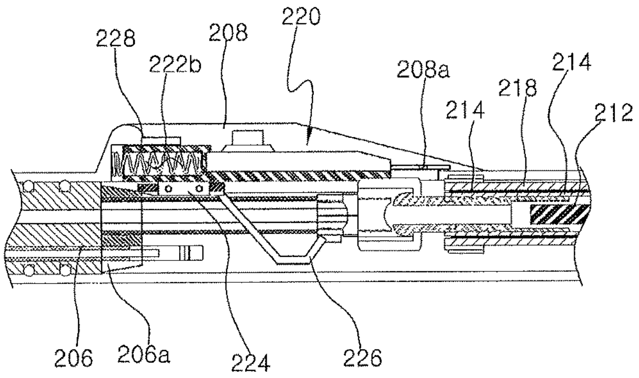
Figure 9:
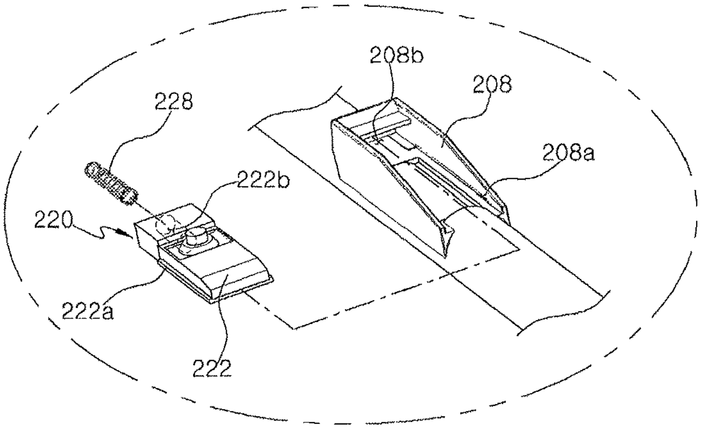
FIG. 9 is a partially enlarged exploded perspective view of portion "A" shown in FIG. 8.

FIG. 2 is a sectional view of a plasma torch according to an embodiment of the present invention; FIG. 3 is an exploded perspective view of the plasma torch according to the embodiment of the present invention; FIG. 4 is an exploded sectional view of the plasma torch according to the embodiment of the present invention; FIG. 5 is a sectional view shown for describing a moving route of air in the plasma torch according to the embodiment of the present invention; FIG. 6 is a sectional view of a welding cable shown in FIG. 2; FIG. 7 shows sectional views respectively taken along line A-A and line B-B shown in FIG. 6; FIG. 8 is a view showing the operation of a switch member shown in FIG. 2; and FIG. 9 is a partially enlarged exploded perspective view of portion “A” shown in FIG. 8.

Referring to FIGS. 2 to 9, the plasma torch 100 according to the embodiment of the present invention includes a tube 110; a body 120; an insulator 140; an amplification tube 150; a housing 160; a nozzle 170; an inner cap 180; and an insulation cap 190.

The tube 110 includes: a first diameter part 112 provided with a hollow channel 112*a* to which air is introduced along a longitudinal direction; and a second diameter part 114 provided at a predetermined position on an outer circumferential surface of the first diameter part 112 and having a plurality of cut grooves 114*a* formed in a circumferential direction of the second diameter part and spaced apart from each other at regular intervals.

In addition, a branch tube 116 is provided on the tube 110 at a predetermined position in a longitudinal direction thereof, wherein the branch tube has a vortex inducing part 116*a* formed on an outer circumferential surface of the branch tube and in a spiral shape so that the branch tube 116 is located between an inner circumferential surface of the body 120 and an outer circumferential surface of the tube 110, that is, the outer circumferential surface of the first diameter part 112.

In other words, a first branch flow line 117 is formed between the vortex inducing part 116*a* and the inner circumferential surface of the body 120; a second branch flow line 119 is formed between the outer circumferential surface of the first diameter part 112 and an inner circumferential surface of the branch tube 116.

In addition, a seat ring 118 is combined with a first end part of the first diameter part 112, the seat ring 118 being seated in a seat part 120*b* formed at a predetermined position on the inner circumferential surface of the body 120.

The body 120 includes: a housing part 122 housing the tube 110 therein; and a plurality of first and second discharge holes 123, 124 formed at predetermined positions in longitudinal directions of the body, the first and second discharge holes being formed in respective circumferential directions of the body and respectively spaced apart from each other at regular intervals.

In addition, a first thread part 125 is formed on an inner surface of a first end of the body 120 so that an electrode 130 is engaged with the body 120, and a second thread part 126 is formed on a predetermined position in a longitudinal direction of the body 120 so that the amplification tube 150 is engaged with the body 120, and a third thread part 127 is formed on an inner surface of a second end of the body 120.

Here, the second thread part 126 is provided between the plurality of first and second discharge holes 123, 124. In this case, the second discharge holes 124 are formed on slant part 120*a* formed between the second thread part 126 and the outer circumferential surface of the body 120.

The control cap 128 is engaged with a second end of the body 120, that is, with the third thread part 127. The control cap 128 includes: a seat groove 128*a* therein; and an engaging hole 128*b* provided at a predetermined position on an outer circumferential surface of the control cap 128, the engaging hole 128*b* communicating with the seat groove 128*a*.

A coil spring 129 is provided in the seat groove 128*a*, a first end of the coil spring 129 being supported by a lower end of the seat groove 128*a*, and a second end thereof being supported by a second end of the tube 110, wherein the coil spring 129 applies an elastic force to a seating part 136*b* formed on a second end part of an inner circumferential surface of a body part 136 of an air guide part 134 provided in the electrode 130 so that the tube 110, that is, a first end of the first diameter part 112 comes in close contact with the seating part 136*b*.

Here, an air supply tube 204 provided in a handle 200 mentioned hereinafter is fitted into the engaging hole 128*b* of the control cap 128, wherein the air supply tube 204 supplies air to the hollow channel 112*a* formed in the first diameter part 112 of the tube 110, and supplies negative electric current to the electrode 130 engaged with the first end of the body 120.

The electrode 130 is engaged with the first thread part 125 of the body 120 in such a manner that the electrode may be locked to or unlocked from the first thread part 125, wherein the electrode 130 generates a plasma flame between the electrode and the base material (not shown) to which positive electric current is applied, tip of the electrode being provided with an electrode material 132, which is a material resistant to high temperature (for example, hafnium or zirconium).

Furthermore, the air guide part 134 is provided in the electrode 130, and after air introduced to the electrodes through a hollow channel 112*a* formed in the first diameter part 112 of the tube 110 hits inner surfaces of the electrode 130, and cools the electrode 130, the air guide part 134 guides the air to be discharged to a space formed between the outer circumferential surface of the first diameter part 112 and the inner circumferential surface of the body 120. The air guide part 134 includes: the body part 136 provided with a through-hole 136*a* therein; and a plurality of protrusions 137 provided on the outer circumferential surface of the body part 136, the plurality of protrusions 137 being formed in a circumferential direction and spaced apart from each other at regular intervals.

In this case, it is preferred that the seating part 136*b* is formed on a first end part of an inner circumferential surface of the body part 136, and is formed to correspond to a first end of the first diameter part 112 so that a first end of the tube 110 that is the first end of the first diameter part 112 comes in close contact with and engaged with the seating part 136*b*.

The insulator 140 includes a plurality of first discharge flow lines 142 formed at predetermined positions vertically located from the body 120 and formed in a circumferential direction of the insulator 140 and spaced apart from each other at regular intervals, the insulator 140 being engaged with the outer circumferential surface of the body 120, wherein the housing 160 described hereinafter is insulated from the body 120 by the insulator 140.

The amplification tube 150 includes a space part 154 being defined over an outer circumferential surface of the body 120 and communicating with the second discharge holes 124, wherein the amplification tube 150 is engaged with the body 120 such that the amplification tube 150 is located between the body 120 and the insulator 140.

That is, the space part 154 is formed between an inner circumferential surface of the amplification tube 150 and the outer circumferential surface of the body 120. Here, the space part 154 serves as an air moving passage, wherein air passes through the space part 154 and then passes through the first branch flow line 117 formed between the vortex inducing part 116*a* formed on an outer circumferential surface of the branch tube 116 mentioned above and the inner circumferential surface of the body 120, and then passes through the second discharge holes 124, and the air discharged through the second discharge holes 124 moves to a space formed between the electrode 130 and the nozzle 170, and then is discharged to an outside through a discharge hole 172 formed at a first end of the nozzle 170.

In this case, the speed of the air passing through the space part 154 to the space formed between the electrode 130 and the nozzle 170, and then being discharged to an outside through the discharge hole 172 formed at the first end of the nozzle 170 increases while passing though the space part 154.

That is, since negative electric current supplied to the electrode 130 through the air supply tube 204 fitted to the engaging hole 128*b* of the control cap 128 runs in the same direction parallel to the direction of the body 120 and the amplification tube 150, two magnetic fields are produced by two lines of currents running in the body 120 and in the amplification tube 150. A force generated between the two magnetic fields is exerted to the space part 154, thereby increasing the moving speed of air passing through the space part 154.

Third discharge holes 152 are formed on a second end of the outer circumferential surface of the amplification tube 150, the third discharge holes 152 communicating with the first discharge holes 123, and the third discharge holes 152 enabling air passing through the second branch flow line 119 provided between the outer circumferential surface of the first diameter part 112 and the inner circumferential surface of the branch tube 116 to be supplied to the first discharge flow lines 142 formed in the insulator 140.

The housing 160 includes a plurality of second discharge flow lines 162 formed at predetermined positions of the inner circumferential surface of the housing 160 and in a circumferential direction of the housing, and spaced apart from each other at regular intervals. Here, the second discharge flow lines 162 communicate with a first end of the housing 160. Further, the housing 160 is engaged with an outer circumferential surface of the insulator 140, and the nozzle 170 is inserted into the first end of the housing 160.

Air discharged through the first discharge flow lines 142 provided in the insulator 140 is supplied to the second discharge flow lines 162, and is then supplied through the second discharge flow lines 162 to an air discharge ring 182 provided on an inner circumferential surface of a first end of the inner cap 180 mentioned below.

It is preferred that at least one protruded jaw 174 is provided at a predetermined position of the outer circumferential surface of the nozzle 170, the at least one protruded jaws being provided in a circumferential direction of the nozzle 170. The protruded jaws are intended to efficiently perform cooling of the nozzle 170 by producing a vortex in such a manner that when air discharged through the air discharge ring 182 is supplied to a space provided between the outer circumferential surface of the nozzle 170 and an inner circumferential surface of the insulation cap 190 mentioned below, the air hits the protruded jaws 174.

A cover 202 provided at a first end of the handle 200 is combined with the second end of the housing 160 so that the control cap 128, the body 120, and the insulator 140 mentioned above are located in the cover 202.

In addition, a sub power cable 206 is provided in the handle 200, a first end of the sub power cable 206 being in contact with an inner part of the housing 160, and a second end thereof being provided with a contact ring 206*a*.

When the switch member 220 slidably combined with a guide part protruding from a predetermined position of an upper part of the handle comes in contact with the contact ring 206*a*, a negative electric current running in the air supply tube 204 is supplied to the sub power cable, and the negative electric current is supplied through the sub power cable to the nozzle 170 inserted into the first end of the housing 160.

That is, if a negative electric current is supplied to the nozzle 170, the speed of air moving to a space provided between the outer circumferential surface of the electrode 130 and the inner circumferential surface of the nozzle 170 increases. That is, two negative electric currents running in the electrode 130 and in the nozzle 170 run in the same direction parallel to each other, and the two currents running in the electrode 130 and in the nozzle 170 produce two magnetic fields. A force generated between the two magnetic fields is exerted to a space provided between the outer circumferential surface of the electrode 130 and the inner circumferential surface of the nozzle 170, thereby increasing a moving speed of air passing through the space provided between the outer circumferential surface of the electrode 130 and the inner circumferential surface of the nozzle 170.

Accordingly, as air passing through the space provided between the outer circumferential surfaces of the electrode 130 and the inner circumferential surface of the nozzle 170 moves faster, a plasma flame projects long and straight without expanding, thereby minimizing damage to the nozzle 170 that may be caused by the plasma flame and prolonging the lifespan of the nozzle 170.

The switch member 220 includes: a slide 222 having guide protrusions 222*a* at opposite sides of the slide, the guide protrusions 222*a* being combined with guide grooves 208*a* being provided at opposed sides of the inner part of the guide part 208 and in longitudinal directions of the guide part; a contact terminal 224 is combined with a lower part of the slide 222 at a predetermined position, the contact terminal 224 being selectively in contact with the contact ring 206*a* depending on a slide movement of the slide 222; and a connecting cable 226, the first end of the connecting cable being combined with the contact terminal 224, and the second end of the connecting cable 226 being combined with a predetermined position of the air supply tube 204.

Additionally, a spring 228 is provided between a first side in the guide part 208 and the slide 222, the spring 228 applying an elastic force to the slide 222, and a first side in the guide part 208 and a first side of the slide 222 are provided with housing grooves 208*b*, 222*b*, a first end and a second end of the spring 228 being housed in and supported by the housing grooves 208*b*, 222*b* such that the housing grooves face each other.

Furthermore, a welding cable 210 is combined with a second portion of the handle 200. The welding cable 210 includes: a bare copper wire 212; an air supply hose 214 having an air passage and located at a position spaced apart at a predetermined interval from an outer circumferential surface of the bare copper wire 212; a copper tape 216 combined with an outer circumferential surface of the air supply hose 214; an outer cover 218 positioned on an outer circumferential surface of the copper tape 216; connectors 217, portions of outer circumferential surfaces of the connectors being inserted into diametrically opposite end parts of the air supply hose 214, and respective end parts of the connectors being combined with diametrically opposite end parts of the bare copper wire 212; a socket 219 provided at a second end part of the connector 217.

In this case, it is preferred that any one end part of opposite end parts of a copper tape 216 is connected to any one end part of opposite end parts of the connectors 217, which enables a negative electric current running through the bare copper wire 212 to run in the same direction as the direction of the negative electric current running through the copper tape 216, thereby increasing the moving speed of air passing through an air passage provided between the bare copper wire 212 and the air supply hose 214.

That is, a magnetic field is produced around the bare copper wire 212 and the copper tape 216 by two currents running in the same direction in the bare copper wire 212 and the copper tape 216, and since a force generated between the two magnetic fields is directed to the air passage provided between the bare copper wire 212 and the air supply hose 214, the moving speed of the air passing through the air passage increases.

An inner cap 180 is combined with an outer circumferential surface of the housing 160 in such a manner that a portion of the nozzle 170 is exposed to an outside of the inner cap 180, and an air discharge ring 182 is combined with a first end of the inner cap 180. The air discharge ring includes a flange part 182*a*, the flange part 182*a* having a plurality of discharge holes 182*b* formed in a circumferential direction thereof and spaced apart from each other at regular intervals, and protruding in a direction parallel to an inner circumferential surface of the inner cap 180. Air discharged through the second discharge flow lines 162 provided in the housing 160 is supplied to the air discharge ring 182. The air is then supplied through the air discharge ring 182 to the outer surface of the nozzle 170, thereby cooling the nozzle 170.

With the insulation cap 190 made of a ceramic material and engaged with the outer surface of the inner cap 180, air discharged through the air discharge ring 182 of the inner cap 180 moves along all the outer surface of the nozzle 170, thereby cooling the nozzle 170, and preventing a plasma flame produced in the discharge hole 172 of the nozzle 170 from expanding.

In this case, a plurality of vortex producing grooves 192 are provided at predetermined positions on the inner circumferential surface of the insulation cap 190, the vortex producing grooves 192 being spaced apart from each other at regular intervals. Air moving along the space provided between the outer circumferential surface of the nozzle 170 and the inner circumferential surface of the insulation cap 190 hits the vortex producing groove 192 and then hits the outer circumferential surface of the nozzle 170, thereby efficiently cooling the nozzle 170, so that the plasma torch can produce a long and straight plasma flame.

In addition, a first end part of the insulation cap 190 includes a block part 194 provided with a discharge hole 194*a* communicating with the discharge hole 172 provided at a first end part of nozzle 170. When a negative electric current is supplied to the nozzle 170 by operation of the switch member, the block part 194 prevents a short circuit from taking place between the base material to which positive electric current is applied and the nozzle 170.

Furthermore, the block part 194 includes a plurality of assistant discharge holes 194*b*, the assistant discharge holes being spaced apart at a predetermined interval from the discharge hole 194*a* and in a circumferential direction and being spaced apart from each other at regular intervals. The assistant discharge holes 194*b* discharge air moving along a space provided between the inner circumferential surface of the insulation cap 190 and the outer circumferential surface of the nozzle 170, thereby preventing a plasma flame from expanding.

Hereinafter, operation of a plasma torch having the above-mentioned configuration will be described.

First, if air and power are supplied to the air supply tube 204, air is supplied to the hollow channel 112*a* provided in the first diameter part 112 of the tube 110, the air supplied to the hollow channel 112*a* hits inner surface of the electrode 130, cooling the electrode 130, and then the air is moved to the space defined between the outer circumferential surface of the first diameter part 112 and the inner circumferential surface of the body 120 by the air guide part 134.

Further, after the air moved to the space defined between the outer circumferential surface the first diameter part 112 and the inner circumferential surface of the body 120 passes through the plurality of cut grooves 114*a* formed on the second diameter part 114, the air is divided by the branch tube 116 and moves into the first branch flow line 117 provided between the vortex inducing part 116*a* and the inner circumferential surface of the body 120, and into the second branch flow line 119 provided between the outer circumferential surface of the first diameter part 112 and the inner circumferential surface of the branch tube 116.

After the air moved to the first branch flow line 117 moves along the vortex inducing part 116*a*, the air moves through the second discharge holes 124 provided at the body 120 to the space part 154 provided between the outer circumferential surface of the body 120 and the inner circumferential surface of the amplification tube 150, and then while moving along the space provided between the outer circumferential surface of the electrode 130 and the inner circumferential surface of the nozzle 170, the air cools the outer surface of the electrode 130, and is discharged to an outside through the discharge hole 172 provided in the nozzle 170.

In this case, the moving speed of air supplied to the space part 154 provided between the outer circumferential surface of the body 120 and the inner circumferential surface of the amplification tube 150 increases while passing through the space part 154 due to a force generated by magnetic fields produced in the body 120 and in the amplification tube 150 respectively.

After air moved to the second branch flow line 119 consecutively passes through the first discharge holes 123 and the third discharge holes 152, the air is supplied to the first discharge flow lines 142 provided in the insulator 140, and the air supplied to the first discharge flow lines 142 passes the second discharge flow lines 162 provided in the housing 160, and is then supplied to the air discharge ring 182 of the inner cap 180.

The air supplied to the air discharge ring 182 passes through the discharge holes **182*b* formed in the air discharge ring 182, and then while moving along the space provided between the inner circumferential surface of the insulation cap 190 and the outer circumferential surface of the nozzle 170, the air cools the nozzle 170**.

Additionally, an electric current supplied to the air supply tube 204 applies a negative electric current to the electrode 130.

With the negative electric current applied to the electrode 130, if the plasma torch 100 is moved to the base material, an electric arc takes place between the electrode 130 and the base material to which a positive electric current is applied, thereby producing a plasma flame.

In this state, by slidably moving the switch member 220, the contact terminal 224 combined with the slide 222 comes in contact with the contact ring **206*a*, and if a negative electric current is supplied to the nozzle 170 through a sub power cable 206, as mentioned above, the moving speed of air passing through the space provided between the outer circumferential surface of the electrode 130 and the inner circumferential surface of the nozzle 170 increases, so that the plasma torch can produce a long and straight plasma flame. Accordingly, the present invention can minimize damage to the nozzle 170 that may be caused by the long and straight plasma flame, thereby extending the lifespan of the nozzle 170**.

Accordingly, the plasma torch according to the embodiment of the present invention can increase the moving speed of air supplied through the welding cable and the amplification tube, thereby increasing the projecting speed of a high temperature plasma flame in a flame projecting direction.

In addition, the plasma torch can extend lifespan of the nozzle by minimizing the damage to the nozzle caused by a plasma flame.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention relates to a plasma torch. More particularly, the present invention may be applied to a plasma torch constructed such that the plasma torch has a simple structure, and can increase the speed of a high temperature plasma flame in a flame projecting direction.

What is claimed is:

1. A plasma torch comprising:

a tube including: a first diameter part provided with a hollow channel to which air is introduced along a longitudinal direction; and a second diameter part provided at a predetermined position on an outer circumferential surface of the first diameter part and having a plurality of cut grooves formed in a circumferential direction of the second diameter part and spaced apart from each other at regular intervals;

a body including: a housing part receiving the tube extending therein; and a plurality of first and second discharge holes formed at predetermined positions in longitudinal directions of the body, the first and second discharge holes being formed in circumferential directions of the body and spaced apart from each other at regular intervals, wherein two electrodes arc an electrode is combined with a first end of the body;

an insulator including a plurality of first discharge flow lines formed at predetermined positions vertically located from the body and formed in a circumferential direction of the insulator and spaced apart from each other at regular intervals, the insulator being combined with an outer circumferential surface of the body;

an amplification tube being engaged with the body and being located between the body and the insulator in such a manner that a space part communicating with the second discharge holes is formed between the out outer circumferential surface of the body and an inner surface of the amplification tube, the amplification tube including and third discharge holes formed on an end part of an outer surface of the amplification tube, the third discharge holes communicating with the first discharge holes and the third discharge holes communicating with the first discharge flow lines of the insulator;

a housing including a plurality of second discharge flow lines, the second discharge flow lines extending from predetermined positions of an inner circumferential surface of the housing to a first end of the housing, and formed in a circumferential direction of the housing and spaced apart from each other at regular intervals, wherein the housing is engaged with an outer circumferential surface of the insulator in such a manner that the second discharge flow lines communicating with the first discharge flow lines, and a nozzle is inserted to the first end of the housing;

a handle including a cover provided at a first portion of the handle; and an air supply tube provided therein, wherein the cover receiving the body and the insulator therein is combined with a second end of the housing;

an inner cap combined with an outer circumferential surface of the housing in such a manner that a portion of the nozzle is exposed to an outside of the inner cap; and an insulation cap engaged with an outer circumferential surface of the inner cap.

2. The plasma torch of claim 1, wherein a branch tube is provided on the tube at a predetermined position in a longitudinal direction thereof, the branch tube including a vortex inducing part formed on an outer circumferential surface of the tube and in a spiral shape, the vortex inducing part being located between an inner circumferential surface of the body and the outer circumferential surface of the tube, and a first branch flow line is formed between the vortex inducing part and the inner circumferential surface of the body, and a second branch flow line is formed between the outer circumferential surface of the tube and an inner circumferential surface of the branch tube.

3. The plasma torch of claim 1, wherein an air guide part is provided in the electrode, and when air introduced to the electrode through a hollow channel formed in the first diameter part of the tube hits inner surfaces of the electrode, the air guide part guides the air to be discharged to a space formed between the outer circumferential surface of the first diameter part and the inner circumferential surface of the body.

4. The plasma torch of claim 3, wherein the air guide part includes a body part provided with a through-hole therein; and a plurality of protrusions provided on an outer circumferential surface of the body part, the plurality of protrusions being formed in a circumferential direction thereof and spaced apart from each other at regular intervals.

5. The plasma torch of claim 1, wherein an air discharge ring is combined with a first end of the inner cap, the air discharge ring including a flange part, the flange part having a plurality of discharge holes formed in a circumferential direction thereof and spaced apart from each other at regular intervals, the flange part protruding in a direction parallel to an inner circumferential surface of the inner cap.

6. The plasma torch of claim 1, wherein a plurality of vortex producing grooves are provided at predetermined positions on an inner circumferential surface of the insulation cap, the vortex producing grooves being spaced apart from each other at regular intervals.

7. The plasma torch of claim 1, wherein a control cap is engaged with the second end of the body, the control cap including: a seat groove therein, and an engaging hole provided at predetermined position on an outer circumferential surface of the control cap, the engaging hole communicating with the seat groove, wherein a coil spring is provided in the seat groove, a first end of the coil spring being supported by a lower end of the seat groove, and a second end thereof being supported by a second end of the tube.

8. The plasma torch of claim 1, wherein at least one protruded jaw is provided at a predetermined position of an outer circumferential surface of the nozzle, the at least one protruded jaws being provided in a circumferential direction of the nozzle.

9. The plasma torch of claim 1, wherein a welding cable is combined with a second portion of the handle, the welding cable including: a bare copper wire; an air supply hose having an air passage and located at a position spaced apart at a predetermined interval from an outer circumferential surface of the bare copper wire; a copper tape combined with an outer circumferential surface of the air supply hose; an outer cover positioned on an outer circumferential surface of the copper tape; connectors, portions of outer circumferential surfaces of which are inserted into diametrically opposite end parts of the air supply hose, and respective ends of which are combined with diametrically opposite ends of the bare copper wire; a socket provided at a second end of the connector, wherein any one end part of opposite end parts of a metallic tube is connected to any one end part of opposite end parts of the connectors.

10. The plasma torch of claim 1, wherein a sub power cable is provided in the handle, a first end of the sub power cable being in contact with an inner part of the housing, and a second end thereof being provided with a contact ring, and when a switch member slidably combined with a guide part formed protruding from a predetermined position of an upper part of the handle comes in contact with the contact ring, power running in the air supply tube is supplied to the sub power cable.

11. The plasma torch of claim 10, wherein the switch member includes: a slide having guide protrusions at opposite sides of the slide, the guide protrusions being engaged with guide grooves provided at opposed sides of the inner part of the guide part and in longitudinal directions of the guide part; a contact terminal combined with a lower part of the slide at a predetermined position; and a connecting cable, the first end of the connecting cable being combined with the contact terminal, and the second end of the connecting cable being combined with a predetermined position of the air supply tube.

12. The plasma torch of claim 11, wherein a spring is provided between a first side in the guide part and the slide, the spring applying an elastic force to the slide, and a first side in the guide part and a first side of the slide are provided with housing grooves, a first end and a second end of the spring being housed in and supported by the housing grooves such that the housing grooves face each other.

* * * * *